(12) United States Patent
K T

(10) Patent No.: US 10,886,861 B2
(45) Date of Patent: Jan. 5, 2021

(54) GENERATING A CONTROLLED STATIC ELECTRICITY IN A PROPENSITY MEDIUM

(71) Applicant: HCL Technologies Limited, Noida (IN)

(72) Inventor: Gandhi Karuna K T, Chennai (IN)

(73) Assignee: HCL TECHNOLOGIES LIMITED

( * ) Notice: Subject to any disclaimer, the term of this patent is extended or adjusted under 35 U.S.C. 154(b) by 255 days.

(21) Appl. No.: 16/172,865

(22) Filed: Oct. 29, 2018

(65) Prior Publication Data

US 2019/0386585 A1 Dec. 19, 2019

(30) Foreign Application Priority Data

Jun. 13, 2018 (IN) .............................. 201811022101

(51) Int. Cl.
*H02N 13/00* (2006.01)
*G01D 15/28* (2006.01)

(52) U.S. Cl.
CPC ............. *H02N 13/00* (2013.01); *G01D 15/28* (2013.01)

(58) Field of Classification Search
CPC ....... H02N 13/00; H02N 11/002; G01D 15/28
USPC .......................................................... 361/233
See application file for complete search history.

(56) References Cited

U.S. PATENT DOCUMENTS

| 3,916,270 | A | | 10/1975 | Wachtler et al. |
| 4,648,887 | A | * | 3/1987 | Noda .................. H02M 5/2576 95/7 |
| 5,173,834 | A | | 12/1992 | Sogoh |
| 8,665,578 | B2 | | 3/2014 | Pelrine et al. |
| 2012/0126042 | A1 | * | 5/2012 | Bryant .................. B05B 5/0531 239/708 |

FOREIGN PATENT DOCUMENTS

CN 202045032 U 11/2011

OTHER PUBLICATIONS

"A Practical Guide to Controlling Electrostatic Charges on Film Webs" SIMCO Industrial Static Control Hatfield, Pennsylvania.

* cited by examiner

*Primary Examiner* — Kevin J Comber
(74) *Attorney, Agent, or Firm* — HM Law Group LLP; Vani Moodley, Esq.

(57) ABSTRACT

The present disclosure relates to system(s) and method(s) for generating a controlled static electricity in a propensity medium. The system receives an input signal indicating a target static electricity to be generated in the propensity medium, and a DC voltage from a power source. Furthermore, the system converts the DC voltage into an AC voltage. Furthermore, the system multiplies the AC voltage using a voltage multiplier to generate a static electricity. The voltage multiplier comprises a plurality of a set of capacitors and diodes. The system further measures the static electricity. Further, the system compares the static electricity and the target static electricity. Based on the comparison, the system configures the voltage multiplier by modifying at least one set of capacitors and diodes. Further, the system generates the controlled static electricity in the propensity medium based on the configuration of the voltage multiplier.

6 Claims, 4 Drawing Sheets

… (1)

GENERATING A CONTROLLED STATIC ELECTRICITY IN A PROPENSITY MEDIUM

CROSS-REFERENCE TO RELATED APPLICATIONS AND PRIORITY

The present application claims benefit from Indian Complete Patent Application No 201811022101 filed on 13 Jun. 2018 the entirely of which is hereby incorporated by reference.

TECHNICAL FIELD

The present disclosure in general relates to a field of generation of static electricity. More particularly, the present invention relates to a system and method for generating a controlled static electricity in a propensity medium.

BACKGROUND

Static electricity is the most treacherous area in the field of electronics. At times, the static electricity is generated in a device unintendedly. The unintended generation of the static electricity results in failure of the device. Further, the conventional system and methodologies fails to measure an amount of the static electricity generated in the device. Thus, by the implementation of the conventional system and methodologies one or more electronic circuitries present in the device get damaged. In addition, one or more devices present in vicinity of the device may also experience hindrance in operation due to the static electricity.

SUMMARY

Before the present systems and methods for generating a controlled static electricity in a propensity medium, is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and method for generating the controlled static electricity in the propensity medium. This summary is not intended to identify essential features of the claimed subject matter nor is it intended for use in determining or limiting the scope of the claimed subject matter.

In one implementation, a system for generating a controlled static electricity in a propensity medium is illustrated. The system comprises a memory and a processor coupled to the memory, further the processor is configured to execute programmed instructions stored in the memory. In one embodiment, the processor may execute programmed instructions stored in the memory for receiving an input signal. The input signal may indicate a target static electricity to be generated in the propensity medium. Further, the processor may execute the programmed instructions stored in the memory for receiving a Direct Current (DC) voltage from a power source. Once the DC voltage is received, the processor may execute a programmed instructions stored in the memory for converting the DC voltage into an Alternating Current (AC) voltage using an inverter. Further, the processor may execute the programmed instructions stored in the memory for multiplying AC voltage to generate a static electricity in the propensity medium using a voltage multiplier. In one embodiment, the voltage multiplier may comprise a plurality of set of capacitors and diodes arranged in stages. Furthermore, the processor may execute the programmed instructions stored in the memory for measuring the static electricity using a high impedance sensing probe of a closed loop control unit. The closed loop control unit may compare the static electricity and the target static electricity. Based on the comparison, the closed loop control unit may configure the voltage multiplier by modifying at least one set of capacitors and diodes. The modification of the set of capacitors and diodes may be facilitated by a set of switches. Furthermore, the processor may execute the programmed instructions stored in the memory for generating the controlled static electricity in the propensity medium based on the configuration of the voltage multiplier.

In one implementation, a method for generating a controlled static electricity in a propensity medium is illustrated. In one embodiment, the method may comprise receiving an input signal. The input signal may indicate a target static electricity to be generated in the propensity medium. Further, the method may comprise receiving a Direct Current (DC) voltage from a power source. Once the DC voltage is received, the method may comprise converting the DC voltage into an Alternating Current (AC) voltage using an inverter. Further, the method may comprise multiplying AC voltage to generate a static electricity in the propensity medium using a voltage multiplier. In one embodiment, the voltage multiplier may comprise a plurality of set of capacitors and diodes arranged in stages. Furthermore, the method may comprise measuring the static electricity using a high impedance sensing probe of a closed loop control unit. The closed loop control unit may compare the static electricity and the target static electricity. Based on the comparison, the closed loop control unit may configure the voltage multiplier by modifying at least one set of capacitors and diodes. The modification of the set of capacitors and diodes may be facilitated by a set of switches. Furthermore, the method may comprise generating the controlled static electricity in the propensity medium based on the configuration of the voltage multiplier.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
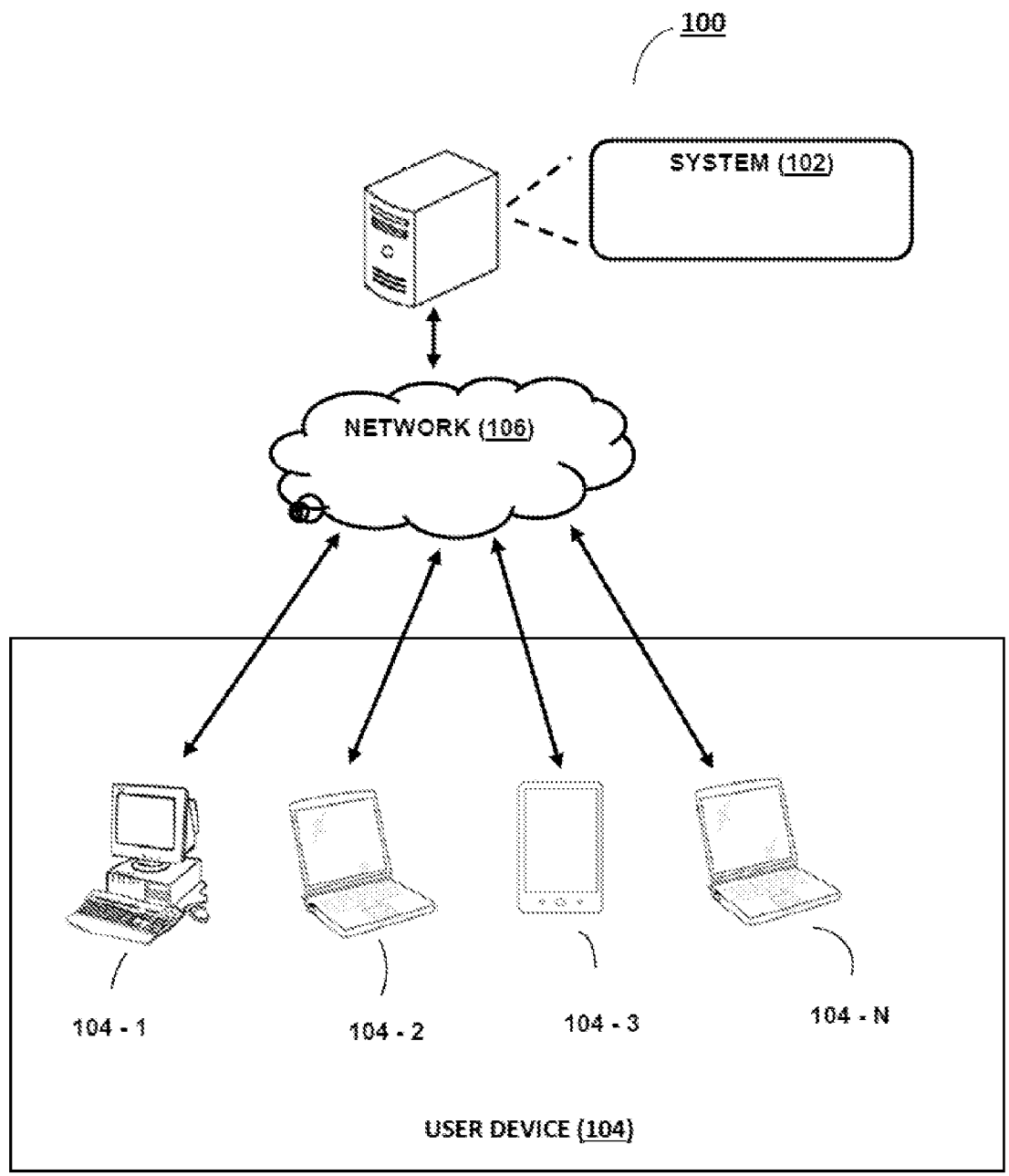
FIG. 1 illustrates a network implementation of a system for generating a controlled static electricity in a propensity medium, in accordance with an embodiment of the present subject matter.
Figure 2:
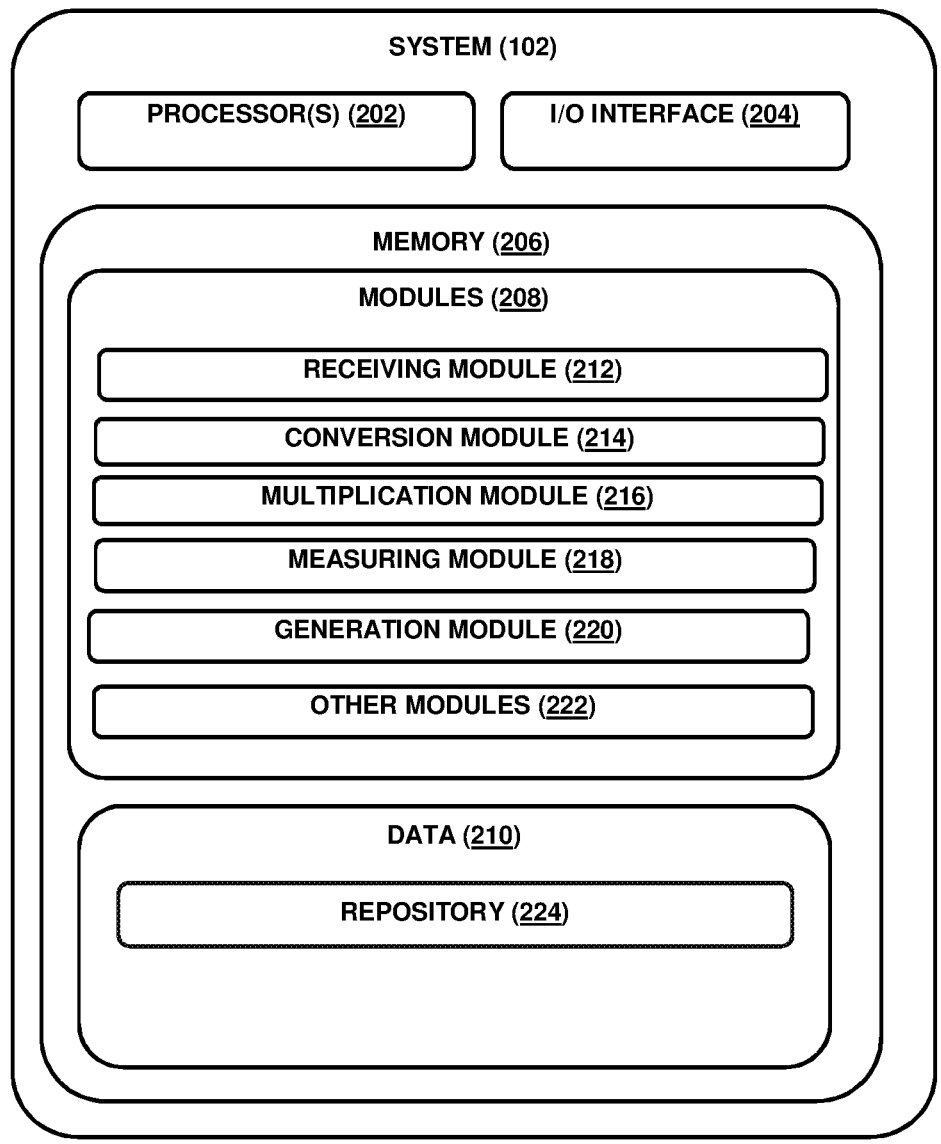
FIG. 2 illustrates the system for generating the controlled static electricity in the propensity medium, in accordance with an embodiment of the present subject matter.

Some embodiments of the present disclosure, illustrating all its features, will now be discussed in detail. The words "receiving", "converting", "multiplying", "measuring", "generating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for generating a controlled static electricity in a propensity medium are now described. The disclosed embodiments of the system and method for generating the controlled static electricity in the propensity medium are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for generating a controlled static electricity in a propensity medium is not intended to be limited to the embodiments illustrated, but is to be accorded the widest scope consistent with the principles and features described herein.

The present subject matter relates to generating a controlled static electricity in a propensity medium. In one embodiment, an input signal may be received based on actuation of a switch. Upon actuation, a device gets triggered to generate a target static electricity in the propensity medium. Further, a DC voltage may be received from a power source. The DC voltage may be converted into an AC voltage using an inverter. Furthermore, the AC voltage may be multiplied using a voltage multiplier to generate a static electricity. The voltage multiplier may comprise a plurality of capacitors and diodes. Further, the static electricity may be measured using a high impedance sensing probe. The static electricity, generated in the propensity medium, may be compared with the target static electricity. Based on the comparison, number of capacitors and diodes, of the plurality of capacitors and diodes, in the voltage multiplier may be modified to generate a controlled static electricity.

Referring now to FIG. 1, a network implementation 100 of a system 102 for generating a controlled static electricity in a propensity medium is disclosed. Although the present subject matter is explained considering that the system 102 is implemented on a server, it may be understood that the system 102 may also be implemented in a variety of an embedded system and computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the system 102 may be configured to receive an input signal based on actuation of a switch. Upon actuation, the system 102 may trigger generation of a target static electricity in the propensity medium. The target static electricity may indicate a voltage required for an electronic device to get attached to the propensity medium. Examples of the propensity medium include, but not limited to, correspond to hair, cloth, and machines. Once the input signal is received, the system 102 may receive a Direct Current (DC) voltage from a power source. In one example, the power source may be a DC battery. Further, the system 102 may convert the DC voltage into an Alternating Current (AC) voltage using an inverter.

In addition, the system 102 may generate a static electricity by multiplying the AC voltage using a voltage multiplier. The voltage multiplier may comprise a plurality of set of capacitors and diodes arranged in stages. Once the static electricity is generated, the system 102 may measure the static electricity using a high impedance sensing probe of a closed loop control unit. In one embodiment, the closed loop control unit may be a module of the system 102. The closed loop control unit may compare the static electricity, generated in the propensity medium, and the target static electricity for effective adherence. Based on the comparison, the closed loop control unit may configure the voltage multiplier by modifying at least one set of capacitors and diodes. The set of capacitors and diodes may be modified using a set of switches. Further, the controlled static electricity may be generated based on the modification of the set of capacitors and diodes.

Referring now to FIG. 2, the system 102 for generating a controlled static electricity in a propensity medium is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, an embedded systems and/or any devices that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communicate with other computing devices, such as web servers and external data servers (not shown). The I/O interface 204 may facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 may include routines, programs, objects, components, data structures, and the like, which perform particular tasks, functions or implement particular abstract data types. In one implementation, the module 208 may include a receiving module 212, a conversion module 214, a multiplication module 216, a measuring module 218, a generation module 220, and other modules 222. The other modules 222 may include programs or coded instructions that supplement applications and functions of the system 102.

The data 210, amongst other things, serve as a repository for storing data processed, received, and generated by one or more of the modules 208. The data 210 may also include a repository 224, and other data 226. In one embodiment, the other data 226 may include data generated as a result of the execution of one or more modules in the other modules 222.

In one implementation, a user may access the system 102 via the I/O interface 204. The user may be registered using the I/O interface 204 in order to use the system 102. In one aspect, the user may access the I/O interface 204 of the system 102 for obtaining information, providing input information or configuring the system 102.

In one embodiment, the receiving module 212 may be configured to receive an input signal. The input signal may be received based on actuation of a switch or a button. Upon actuation, the receiving module 212 may trigger generation of a target static electricity in the propensity medium. The target static electricity may indicate a voltage required by an electronic device to get attached to the propensity medium. Example of the propensity medium includes, but not limited to, hair, cloth, dress, and machines.

In one embodiment, the target static electricity may be less than a pre-defined threshold static electricity. The pre-defined threshold static electricity indicates capacity of one or more components, present in vicinity of the propensity medium, to hold static electric charge. The pre-defined threshold static electricity may be measured using one or more sensors present in the system 102.

Once the input signal is received, the receiving module 212 may further receive a Direct Current (DC) voltage from a power source. In one aspect, the power source may correspond to a DC battery. The DC battery may be a low voltage battery. Further, the DC voltage may be passed through a buck boost step up circuitry. The buck boost step up circuitry may convert the DC voltage into a high DC voltage. In other words, the buck boost step up circuitry may boost the DC voltage to the high DC voltage by a pre-defined value.

Further, the conversion module 214 may be configured to convert the high DC voltage into an Alternating Current (AC) voltage. In one aspect, an inverter may be used to convert the high DC voltage into the AC voltage.

Furthermore, the multiplication module 216 may be configured to multiply the AC voltage using a voltage multiplier to generate a static electricity in the propensity medium. The voltage multiplier may work as a rectifier. The voltage multiplier may comprise a plurality of set of capacitors and diodes arranged in stages. Each stage may comprise a set of capacitor and diode. Each stage may multiply the AC voltage, associated with a preceding stage, based on a component value (i.e. R,C value) of the stage. In one example, construe a voltage multiplier comprising 4 stages i.e. stage1, stage2, stage3, and stage4. In this case, each stage may comprise a capacitor and a diode. The Ac voltage at output of stage1 may be multiplied by the component value of the stage2.

In one embodiment, the AC voltage may be an input to the voltage multiplier and the static electricity generated in the propensity medium may be an output of the voltage multiplier. The AC voltage may be converted into a multiplied DC voltage using the voltage multiplier. The multiplied DC voltage generated at the output of the voltage multiplier corresponds to the static electricity. In other words, the voltage multiplier may convert the AC voltage, with low voltage value, into the multiplied DC voltage, with high voltage value.

Once the static electricity is generated in the propensity medium, the measuring module 218 may be configured to measure the static electricity. In one aspect, the static electricity may be measured using a high impedance sensing probe of a closed loop control unit. The sensing probe may be an electrical conductor. In one embodiment, the sensing probe may be kept at a predefined distance from the propensity medium. The sensing probe may sense the static electricity from distance. The static electricity may be further provided to a high impedance collector. The measuring module 218 may measure the static electricity using the sensing probe and the high impedance collector. Further, the measuring module 218 may compare the static electricity and the target static electricity.

In one embodiment, the high impedance collector, from the closed loop control unit, may provide the static electricity to a Programmable Gain Amplifier (PGA) as an input. The PGA may amplify the static electricity by a gain value selected using a digital command Once the gain value is selected, the PGA may amplify a signal received as input of the PGA. In one example, if the digital command is 10, then the PGA may amplify the inputs 100 times. In another example, if the digital command is 01, then the PGA may amplify the input 10 times. Once the voltage is amplified using the PGA, an Analog to Digital Converter (ADC), of the closed loop control unit, may be used to digitize a value of the static electricity. The value of the static electricity may be used to determine a position of switches in the voltage multiplier. In one example, the position of switches may be compared with a target position of switches, associated with the target static electricity.

Once the static electricity and the target static electricity is compared, the measuring module 218 may configure the voltage multiplier. In one aspect, the configuration of the voltage multiplier may correspond to modifying at least one set of capacitors and diodes. In other words, the configuration of the voltage multiplier corresponds to changing the number of capacitors and diodes. The modification of the set of capacitors and diodes may be facilitated by a set of switches. Each switch, from the set of switches, may enable or disable the capacitors and diodes in the voltage multiplier.

In one embodiment, if the static electricity is less than or greater than the target static electricity, the measuring module 218 may generate an instruction to change position of each switch, from the set of switches. The change in position of each switch, from the set of switches, results in change in number of capacitors and diodes in the voltage multiplier.

In one embodiment, the static electricity may be greater than the target static electricity. If the static electricity is greater than the target static electricity, then the measuring module 218 may reduce at least one set of capacitors and diodes in the voltage multiplier.

In another embodiment, the static electricity may be less than the target static electricity. If the static electricity is less than the target static electricity, then the measuring module 218 may add at least one set of capacitors and diodes in the voltage multiplier.

Further, the generation module 220 may be configured to generate the controlled static electricity in the propensity medium based on the configuration of the voltage multiplier, but not limited to this circuit implementation. In one aspect, the value of controlled static electricity may be based on the number of capacitors and diodes in the voltage multiplier. In one embodiment, the controlled static electricity may be equal to the target static electricity. In the embodiment, the controlled static electricity may not harm the one or more components present in the vicinity of the propensity medium.

In one embodiment, if at least one set of capacitors and diodes is added to the voltage multiplier, then the generation module 220 may increase amount of the controlled static electricity. In another embodiment, if at least one set of capacitors and diodes is reduced from the voltage multiplier, then the generation module 220 may reduce amount of the controlled static electricity.

In one embodiment, once the number of capacitors and diodes in the voltage multiplier is changed, the static electricity may be again generated in the propensity medium. The static electricity may be measured using the high impedance sensing probe. The static electricity may be then compared with the target static electricity. Based on the comparison, the number of capacitors and diodes in the voltage multiplier may be changed. Further, the static electricity may be again generated in the propensity medium. The process of generating, measuring, comparing, modifying and again generating is performed, by the closed loop control unit, till the static electricity is equal to the target static electricity. Thus, the process is an iterative process till generation of the controlled static electricity in the propensity medium.

Figure 3:
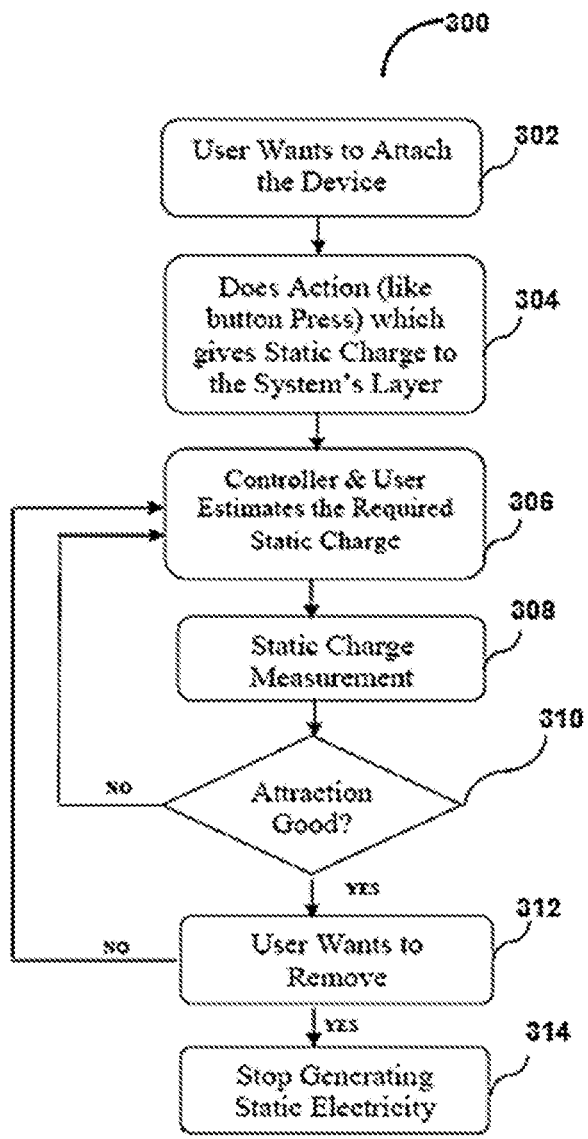
FIG. 3 illustrates a flowchart of an example for a system generating a controlled static electricity in a propensity medium, in accordance with an embodiment of the present subject matter.

Referring now to FIG. 3, a flowchart 300 of an example for a system generating a controlled static electricity in a propensity medium, is disclosed in accordance with an embodiment of the present subject matter. Construe a user who wants to attach a device to a host medium. The device corresponds to the system used for generation of a controlled static electricity. At step 302, the user may want to attach the device to the host medium.

Once the device is attached to the host medium, at step 304, the user may actuate a switch/button. In one implementation, the device may receive an input signal based on the actuation the switch/button. Further, a DC voltage from a battery source may be received and the DC voltage may be converted into a high DC voltage using the buck boost step up circuitry. The high DC voltage may be converted into an AC voltage using an inverter. Further, a voltage multiplier may be used to generate a static electricity in the host medium. At step 306, a target static electricity required to be generated in the host medium may be estimated. The target static electricity may be estimated based on analysis of information received from one or more sensors present in vicinity of the host medium.

At step 308, the static electricity generated in the host medium may be measured. The static electricity may be measured using a sensing probe and a high impedance collector. The static electricity may be further compared with the target static electricity.

At step 310, attraction between the device and the host medium may be checked. The attraction may be checked dependent on the static electricity and the target static electricity. If the attraction is good, then the static electricity and the target static electricity may be equal. In this case, the user may remove the device from the host medium. At step, 312, the user may remove the device from the host medium system from the device. Once the device is removed, at step 314, the generation of the static electricity may be stopped. In order to stop the generation of the user may press the button/switch that the user may have actuated in order to start the static electricity generation.

If the attraction is not good, then the static electricity may be less than or greater than the target static electricity. In this case, number of capacitors and diodes present in the voltage multiplier may be modified in order to configure the voltage multiplier. Based on changing the number of capacitors and diodes, a controlled static electricity may be generated in the host medium. The controlled static electricity may be measured and compared with the target static electricity. In this case, if the attraction between the device and the host medium is good, then the device may get attached to the host medium. Once the device is attached, the user may, after some time, press the switch/button to remove the device from the host medium. In this case, if the attraction is not good (i.e. the controlled static electricity is less than or greater than the target static electricity), then the steps 306, 308, 310 may be again performed, till the time the device gets attached to the host medium. In other words, the steps 306, 308, 310 are associated with the closed loop control unit.

Exemplary embodiments discussed above may provide certain applications. In one embodiment, the system for generating the controlled static electricity may be used as a wearable, an internal implanter, a device and the like.

Exemplary embodiments discussed above may provide certain advantages. Though not required to practice aspects of the disclosure, these advantages may include those provided by the following features.

Some embodiments of the system and the method is configured to provide force required for adhering to an internal implant, that can be used to reduce requirement of magnet to be placed inside human.

Some embodiments of the system and the method is configured to generate controlled static electricity without harming human/electronic devices coming in contact.

Some embodiments of the system and the method is configured to remotely control the generation of the controlled static electricity.

Figure 4:
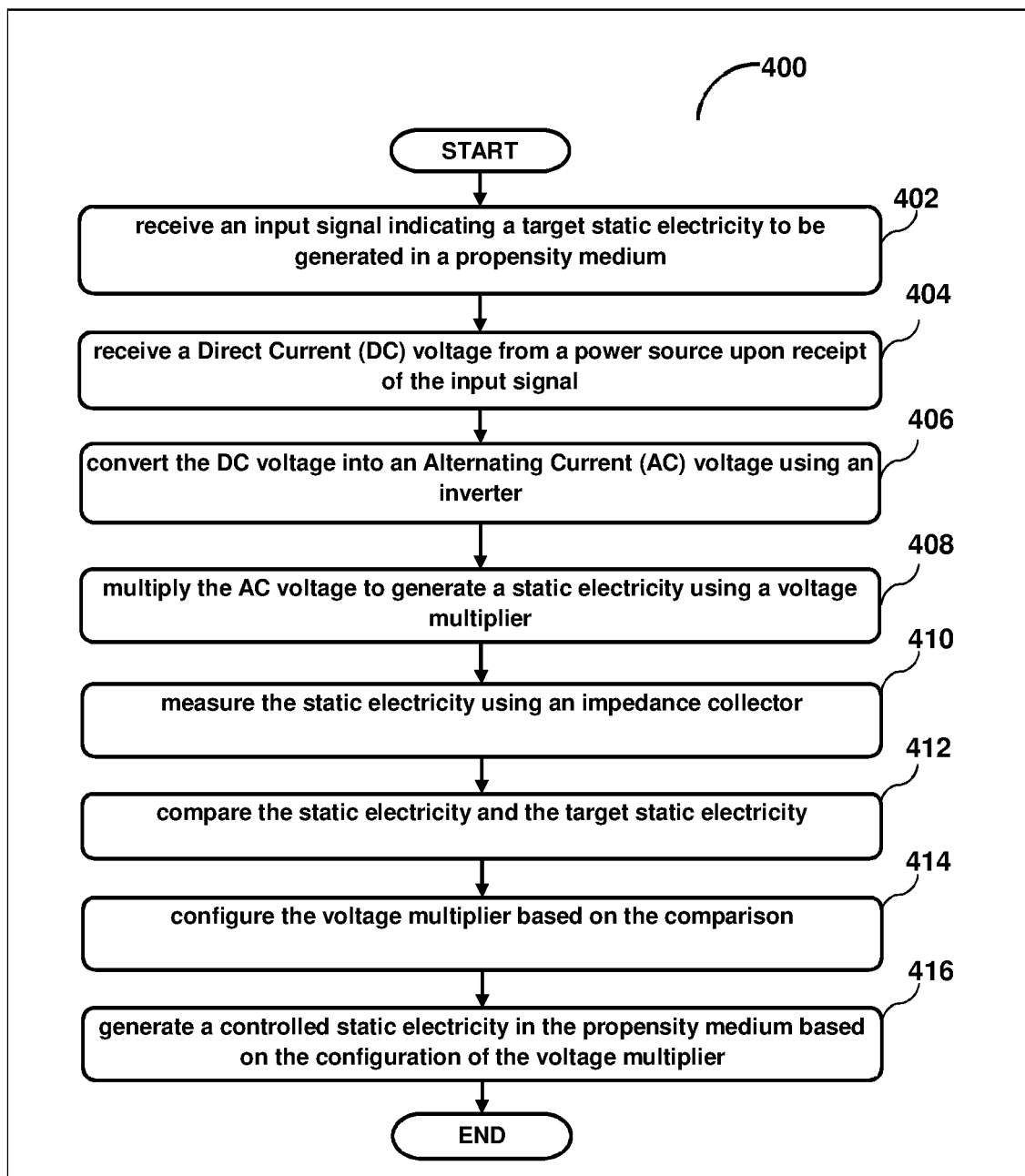
FIG. 4 illustrates a method for generating a controlled static electricity in a propensity medium, in accordance with an embodiment of the present subject matter.

Referring now to FIG. 4, a method 400 for generating a controlled static electricity in a propensity medium, is disclosed in accordance with an embodiment of the present subject matter. The method 400 may be described in the general context of computer executable instructions. Generally, computer executable instructions can include routines, programs, objects, components, data structures, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method 400 can be implemented in any suitable hardware, software, firmware, or combination thereof. However, for ease of explanation, in the embodiments described below, the method 400 may be considered to be implemented in the above described system 102.

At block 402, an input signal may be received. In one implementation, the receiving module 212 may receive the input signal. The input signal may be received based on actuation of a switch. Based on actuation, generation of a target static electricity in the propensity medium may get triggered.

At block 404, a DC voltage may be received from a power source. In one implementation, the receiving module 212 may receive the DC voltage. Further, a buck boost step up circuitry may be configured to convert the DC voltage into a high DC voltage.

At block 406, the high DC voltage may be converted into an AC voltage. In one implementation, the conversion module 214 may convert the high DC voltage into the AC voltage using an inverter.

At block 408, the AC voltage may be multiplied using a voltage multiplier. In one implementation, the multiplication module 216 may multiply the AC using the voltage multiplier. The voltage multiplier may comprise a plurality of set of capacitors and diodes arranged in stages. Each stage may multiply a preceding stage according to component value (i.e. R,C value) of the stage. In one embodiment, a static electricity may be generated in the propensity medium using the voltage multiplier.

At block 410, the static electricity may be measured using a high impedance sensing probe. In one implementation, the measuring module 218 may measure the static electricity.

At block 412, the static electricity and the target static electricity may be compared. In one implementation, the measuring module 218 may be configured to compare the static electricity and the target static electricity.

At block 414, configuration of the voltage multiplier may be facilitated. In one implementation, the measuring module 218 may configure the voltage multiplier. The configuration of the voltage multiplier may correspond to modifying at least one set of capacitors and diodes in the voltage multiplier. The modification of the set of capacitors and diodes may be facilitated by a set of switches. In one aspect, at least one set of capacitors and diodes may be added or reduced in the voltage multiplier.

At block 416, the controlled static electricity may be generated in the propensity medium. The controlled static electricity may be generated based on the configuration of the voltage multiplier. In one implementation, the generation module 220 may generate the controlled static electricity.

Although implementations for systems and methods for generating a controlled static electricity in a propensity medium have been described, it is to be understood that the appended claims are not necessarily limited to the specific features or methods described. Rather, the specific features and methods are disclosed as examples of implementations for generating the controlled static electricity in the propensity medium.

I claim:

1. A system (102) for generating a controlled static electricity in a propensity medium, the system comprising:
    a memory (206);
    a processor (202) coupled to the memory (206), wherein the processor (202) is configured to execute programmed instructions stored in the memory to:
        receive an input signal indicating a target static electricity to be generated in a propensity medium;
        receive a Direct Current (DC) voltage from a power source upon receipt of the input signal;
        convert the DC voltage into an Alternating Current (AC) voltage using an inverter;
        multiply the AC voltage to generate a static electricity in the propensity medium using a voltage multiplier, wherein the voltage multiplier comprises a plurality of set of capacitors and diodes arranged in stages;
        measure the static electricity using a high impedance sensing probe of a closed loop control unit, the closed loop control unit is further configured to
            compare the static electricity and the target static electricity; and
            configure the voltage multiplier, based on the comparison, by modifying at least one set of capacitors and diodes, wherein the modification of the set of capacitors and diodes is facilitated by a set of switches; and
        generate a controlled static electricity in the propensity medium based on the configuration of the voltage multiplier.

2. The system (102) as claimed in claim 1, wherein the configuration of the voltage multiplier corresponds to addition of at least one set of capacitors and diodes, when the static electricity, generated in the propensity medium, is less than the target static electricity.

3. The system (102) as claimed in claim 1, wherein the configuration of the voltage multiplier corresponds to reducing at least one set of capacitors and diodes, when the static electricity, generated in the propensity medium, is greater than the target static electricity.

4. A method for generating a controlled static electricity in a propensity medium, the method comprises steps of:
    receiving, by a processor, an input signal indicating a target static electricity to be generated in a propensity medium;
    receiving, by the processor, a Direct Current (DC) voltage from a power source upon receipt of the input signal;
    converting, by the processor, the DC voltage into an Alternating Current (AC) voltage using an inverter;
    multiplying, by the processor, the AC voltage to generate a static electricity in the propensity medium using a voltage multiplier, wherein the voltage multiplier comprises a plurality of set of capacitors and diodes arranged in stages;
    measuring, by the processor, the static electricity using a high impedance sensing probe of a closed loop control unit, wherein the closed loop control unit is further configured to:
        compare the static electricity and the target static electricity; and
        configure the voltage multiplier, based on the comparison, by modifying at least one set of capacitors and diodes, wherein the modification of the set of capacitors and diodes is facilitated by a set of switches; and generating, by the processor, a controlled static electricity in the propensity medium based on the configuration of the voltage multiplier.

5. The method as claimed in claim 4, wherein the configuration of the voltage multiplier corresponds to addition of at least one set of capacitors and diodes, when the static electricity, generated in the propensity medium, is less than the target static electricity.

6. The method as claimed in claim 4, wherein the configuration of the voltage multiplier corresponds to reducing at least one set of capacitors and diodes, when the static electricity, generated in the propensity medium, is greater than the target static electricity.

* * * * *